UNITED STATES PATENT OFFICE.

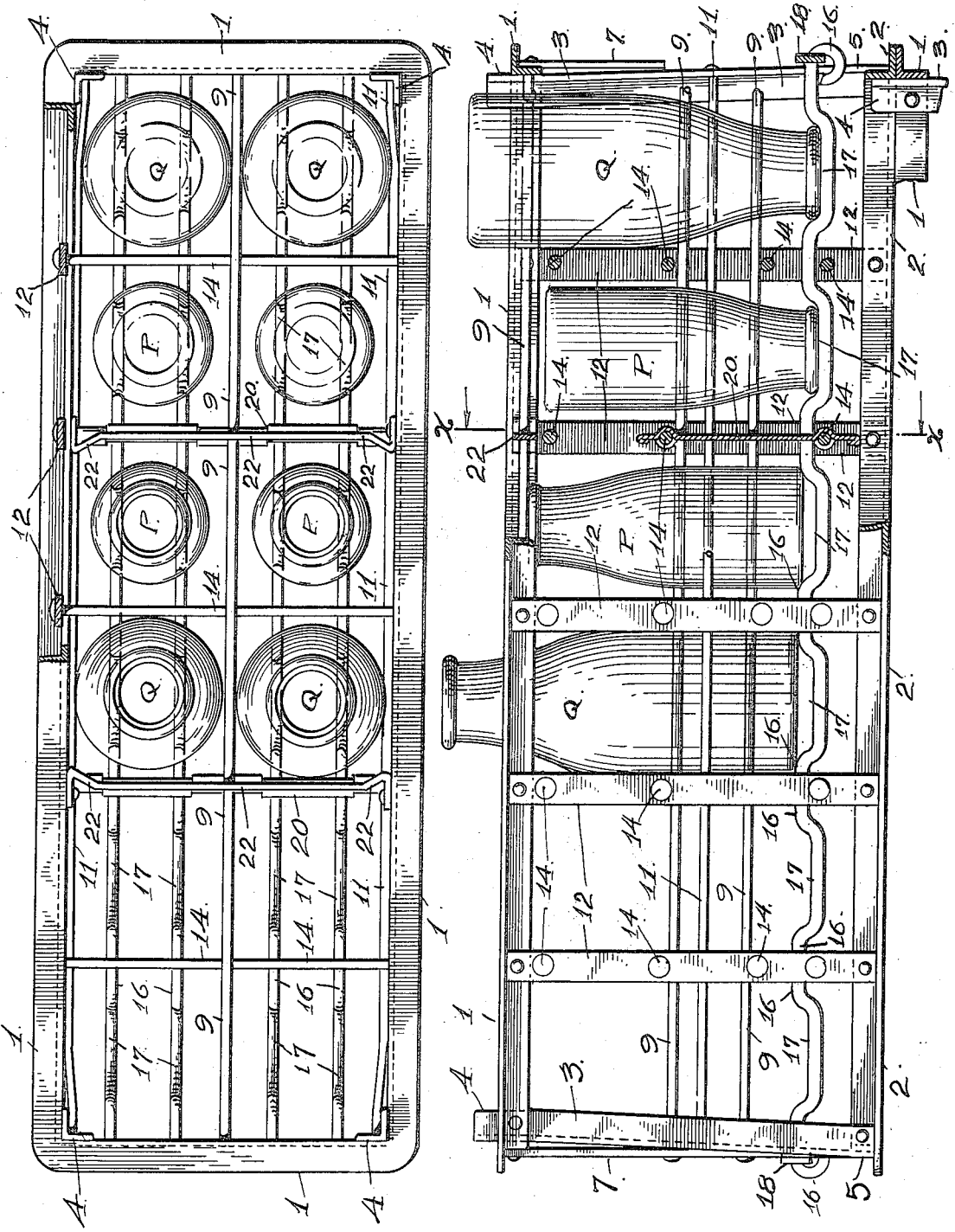

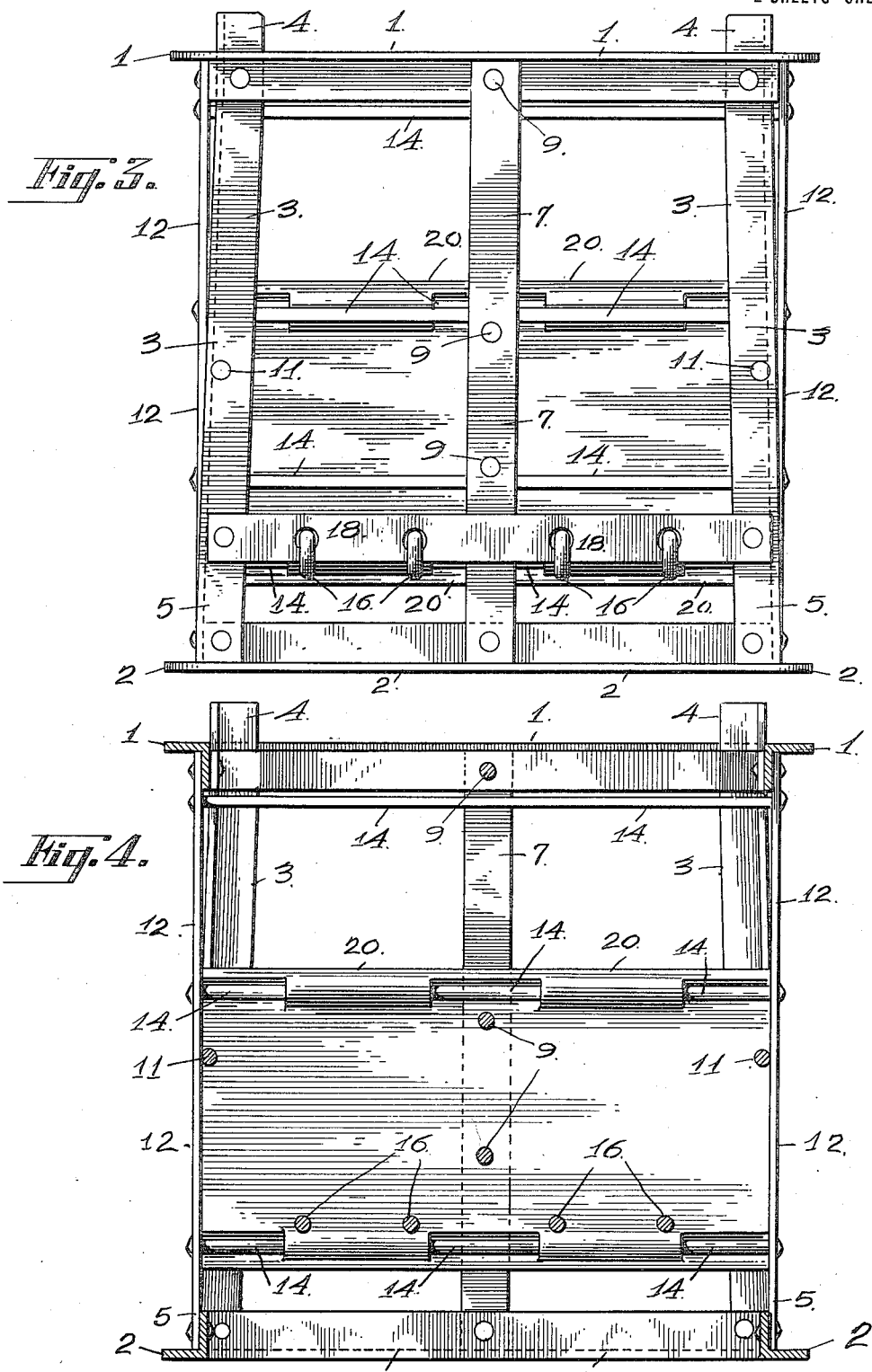

JOHN L. BOWEN, OF SAN FRANCISCO, CALIFORNIA.

MILK-BOTTLE CASE.

1,193,980.  Specification of Letters Patent.  Patented Aug. 8, 1916.

Application filed December 7, 1914. Serial No. 876,168.

*To all whom it may concern:*

Be it known that I, JOHN L. BOWEN, a citizen of the United States, residing in the city and county of San Francisco and State of California, have invented a new and useful Improvement in Milk-Bottle Cases, of which the following is a specification.

My invention relates to improvements in the details of construction and the manner or method of assembling the various parts of a sanitary milk bottle case and has for its objects, first, to provide an improved sanitary milk bottle case arranged for the reception of either pints or quarts, in either an upright or an inverted position; second, to provide an improved milk bottle case wherein the struts or wires used to impart rigidity to the frame are also utilized as partitions in separating the milk bottle case into compartments; third, to provide sheet-metal stiffeners between several of the struts or wires in order to impart an additional rigidity to the case; fourth, to provide horizontally disposed parallel supporting wires for the bottles that are adapted to engage and retain the tops of the milk bottles when inverted in order to retain the same in a position adapted to receive automatic washers now in use in connection with washing milk bottles; and fifth, to provide a milk bottle case composed of upper and lower rectangular angle-iron frames secured together by means of corner angles so arranged that the tops of the corner angles of one case will enter and engage the inner corners of the lower rectangular frame of the case above it without bending, cutting or offsetting the said corner angles. I accomplish these several features by means of the device disclosed in the drawings forming a part of the present specification, wherein like characters of reference are used to designate similar parts throughout the said specification and drawings, and in which—

Figure 1 is a plan view of the improved milk bottle case with one portion of the top frame broken away in order to disclose the side supporting straps and the lateral struts or wires secured thereto. Fig. 2 is a side elevation of the milk bottle case disclosing several quart and pint milk bottles therein, one end of the case being broken away disclosing the manner in which the top of one of the corner angle irons of a lower case is inserted within the inner corners of the lower rectangular frame of the case above it. Fig. 3 is an end elevation of an enlarged scale of the milk bottle case disclosing the manner in which the parallel supporting struts or wires are secured; and Fig. 4 is an enlarged vertical sectional view taken on line X—X of Fig. 2 of the drawings.

The present state of the art discloses various forms of open sanitary milk bottle cases constructed in different forms and for different purposes. Most of the devices employ sheet-metal sides or bottoms, which not only prevent a free circulation of air while cooling but are exposed to serious impact resulting in indentations which injure the case and more or less seriously destroy the rigidity and stability of the milk bottle case. The employment of sheet-metal sides or bottoms also presents an insanitary condition as well as an expensive milk bottle case, both from the standpoint of the cost of the material as well as the cost of assembling this construction.

I propose to provide a cheap, thoroughly open, sanitary milk bottle case that will possess stability as well as durability, and one that may be easily stacked and handled. I also propose to provide a milk bottle case wherein the bottles will be supported and retained in a position best adapted to be entered by the automatic washing machines, now in use, when inverted and while the case is passing through the washing machine. I accomplish these objects by means of the device, which may be described as follows:

Referring to the drawings, the numeral 1 is used to designate an upper rectangular frame formed preferably of an angle iron in such a manner that one of the flanges will extend outward from the rectangle while the other angle thereof extends downward on the inside of the rectangle. I have found this to be the most convenient arrangement for handling the case as well as for securing the several parts together. A lower rectangular frame 2 is formed of a second angle iron arranged with its horizontal flange lowermost and its vertical flange forming the inner side of the rectangle and extending upward. The upper and lower frames 1 and 2, respectively, are rigidly secured together at the corners thereof by means of the corner pieces or angle irons 3. Said corner pieces incline inward slightly at the upper ends 4 thereof, passing inside of and extending beyond the upper surface or flange of the upper rectangular frame 1, while the lower ends 5 of the corner pieces 3 are arranged outside of the inner or vertical flange of the lower rectangular frame 2 with their extremities resting on the upper surface of the horizontally disposed flange thereof.

From the foregoing it will be observed that the corner pieces 3 will effectively secure the upper and lower rectangular frames 1 and 2, respectively, together and at the same time form a stacking means without cutting or offsetting the said corner pieces, as is the present custom with some milk bottle cases. In order to further secure the rectangular frames 1 and 2 together and to add stability thereto, I have provided the supporting straps 7 at both sides of the structure, connected by longitudinally disposed partition wires 9, while similar parallel side wires 11 extend between and are secured to the corner pieces 3. The wires 9 are arranged one above the other and the top wire 9 is riveted on the ends thereof so as to secure the top of the end straps 7 to the ends of the upper rectangular frame 1, at the same time securing the said top wire 9 to the frame and straps. The two lower parallel wires 9 merely extend between the supporting straps 7 and are further secured in a manner hereinafter more fully described.

Vertically disposed supporting straps 12, similar in construction and arrangement to the supporting straps 7, are arranged at regular intervals along the sides of the milk bottle case and have their upper ends secured to the depending inner flange of the upper rectangular frame 1, while the lower ends of the said supporting straps 12 are secured to the upwardly extending inner flange of the lower rectangular frame 2. Horizontally disposed transverse wires 14 are secured between the straps 12 so that, with the longitudinal wires, they form pockets or compartments for the reception of the quart and pint milk bottles Q and P, respectively.

I have provided a simple, cheap and effective means for supporting milk bottles, which consists of two pairs of parallel bottom wires 16 having offset portions or indentations 17 therein arranged just below each compartment formed by the transverse and longitudinal wires 14 and 9. The wires 16 are secured at the ends thereof to the horizontally disposed straps 18 extending across the ends of the milk bottle case and are supported throughout the length thereof by the lowermost transverse wires 14 and also by means of the sheet-metal stiffeners or separators 20, which are strung upon the transverse wires 14 secured between the vertically disposed supporting straps 12, arranged at regular intervals at each side of the milk bottle case. These stiffeners or separator plates 20 are perforated for the passage of the longitudinal wires 9, 11 and 16, and are engaged between the side supporting straps 12 and held in place by means of the lateral or transverse wires 14. Above each stiffener or separator plate 20, I have provided a strut 22, formed of a strap having the ends thereof rigidly secured between the inner surfaces of the depending flanges of the upper rectangular frame 1.

The length of the indentations or offset portions 17 of the supporting wires 16 is such that the top of the bottle, which is of smaller diameter than the body thereof, may readily be seated and retained within the seat formed by the parallel recesses 17 while the bottles are inverted, as when passing through the washing machine. Said seats retain the necks of the inverted milk bottles so that the said bottles may be readily entered by the automatic washing machines, now in use, which enter the bottles and scrub and cleanse the insides thereof. The same bottles, when upright, will extend above the case a little farther, for the reason that the diameter of the bottom of the bottle, either pint or quart, is too great to allow the bottle to enter the seat. By this means the neck of the bottle is projected a little farther from the case so as to provide a ready means for removing the bottles therefrom. The feature of lowering the bottles slightly when in an inverted position so that the bottles will not project too far above the case when passing through the washing machine, thereby preventing the bottles from striking an obstruction and being damaged, is a further advantage obtained by means of the seats produced by the offsets 17.

The stiffeners 20 being arranged at regular intervals and provided of a length equal to the distance between the internal faces of the side supporting straps 12 and further being held rigidly in place by means of the lateral or transverse supporting wires 14, which are riveted on the outer sides of the said straps 12, it is evident that I have means for providing additional stability and rigidity to the milk bottle case in a cheap, efficient and economical manner, for the reason that the said stiffener or separator plate serves as a partition or separation between the compartments and occupies little or no space. It is also obvious that these plates do not inclose the bottles and consequently said bottles may be fully exposed to circulating air currents when in a refrigerator.

The upper ends 4 of the corner pieces 3 extend above the upper surface of the rectangular frame 1 and are arranged to fit inside of the lower rectangular frame of a case stacked above it in order to preserve the alinement, as disclosed in the lower right hand corner of Fig. 2 of the drawings.

By having the lower ends 5 of the corner pieces 3 placed on the outside of the corners of the upwardly extending inner flanges of the lower rectangular frame 2, I have provided a simple and effective means of securing these corner pieces without bending, cutting or offsetting the same, and, at the same time, have provided sufficient riveting space, which arrangement has been found to be more convenient and practical than the arrangement heretofore used on other cases where both ends of the corner pieces 3 were placed either inside or outside of the upper and lower frames. In the former case, the lower ends are receded within the lower rectangular frame so as to form sufficient room for the reception of the extension of the corner pieces of the case below it. In the latter case, a separate stacking means had to be assembled or secured or offset in some manner in order to provide proper alinement.

I am aware that the present state of the art discloses various milk bottle cases comprising upper and lower rectangular frames secured together by corner angle irons. I, therefore, do not wish to claim as my invention such a combination broadly, but What I do claim as my invention and desire to secure by Letters Patent is—

1. A milk bottle case comprising upper and lower rectangular frames, corner pieces of angle iron secured at their lower ends to the outside of the lower frame and near their upper ends to the inside of the upper frame and with their uppermost ends extending above this frame, and longitudinal and transverse elements dividing said case into cells.

2. A milk bottle case comprising an upper frame of angle iron having its inner flange vertical and its upper flange horizontal, a lower frame also of angle iron with its inner flange vertical and its lower flange horizontal, said inner flanges standing in alinement with each other, members having their lower ends secured outside the upright flange of the lower frame, their bodies inclining inward, and their upper portions secured inside the upright flange of the upper frame, upright straps connecting said frames, and longitudinal and horizontal elements between said straps and producing cells.

3. A milk bottle case comprising an upper rectangular frame composed of L-iron having one flange thereof extending outward and the other flange thereof extending downward; a lower rectagular frame composed of L-iron having its horizontal flange lowermost and the other flange thereof extending upward; corner angle irons having the upper ends thereof secured inside of and extending above the corners of the upper frame and the lower ends thereof secured outside of the upwardly extending flange of the lower frame; vertically disposed straps secured between the upper and lower frames and arranged at intervals around the sides and ends of the case; and longitudinal and transverse elements connecting said straps and producing compartments within the case.

4. In a milk bottle case, the combination with upper and lower frames, uprights connecting them, and longitudinal and transverse elements between the uprights and producing compartments; of bottle supports comprising wires arranged in pairs and extending across said compartment, each pair of wires having an offset seat within its compartment smaller than the size of the bottom of the bottle but sufficiently large to receive its mouth.

5. In a milk bottle case, the combination with upper and lower frames, uprights connecting them, and longitudinal and transverse elements between the uprights and producing compartments; of horizontal straps across the endmost uprights, longitudinal wires connecting said straps and arranged in pairs passing through said compartments, each pair of wires being depressed within each compartment to produce a seat smaller than the bottom of the bottle, and transverse wires supporting said longitudinal wires between their seats.

In witness whereof I have hereunto set my signature in the presence of two subscribing witnesses.

JOHN L. BOWEN.

Witnesses:
 ANNA J. MILLER,
 JAMES F. McCUE.